United States Patent
Kapitän et al.

(10) Patent No.: US 12,385,203 B2
(45) Date of Patent: Aug. 12, 2025

(54) ENERGY TRANSMISSION DEVICE AND METHOD FOR ENERGY TRANSMISSION

(71) Applicant: Stemmann-Technik GmbH, 48465 Schüttorf (DE)

(72) Inventors: Eugen Kapitän, Rheine (DE); Sebastian Päsler, Rheine (DE); Andre Bertels, Wettringen (DE); Reimund Glückhardt, Wietmarschen (DE); Rainer Altmeppen, Meppen (DE)

(73) Assignee: Stemmann-Technik GmbH, Schüttorf (DE)

( * ) Notice: Subject to any disclaimer, the term of this patent is extended or adjusted under 35 U.S.C. 154(b) by 675 days.

(21) Appl. No.: 17/639,536

(22) PCT Filed: Oct. 14, 2020

(86) PCT No.: PCT/DE2020/100888
§ 371 (c)(1),
(2) Date: Mar. 1, 2022

(87) PCT Pub. No.: WO2021/073691
PCT Pub. Date: Apr. 22, 2021

(65) Prior Publication Data
US 2022/0325490 A1    Oct. 13, 2022

(30) Foreign Application Priority Data
Oct. 18, 2019    (DE) ............... 10 2019 128 184.9

(51) Int. Cl.
*E02B 3/20*    (2006.01)
*B63J 3/04*    (2006.01)
*H01R 13/631*    (2006.01)

(52) U.S. Cl.
CPC .............. *E02B 3/20* (2013.01); *B63J 3/04* (2013.01); *H01R 13/6315* (2013.01); *B63J 2003/043* (2013.01)

(58) Field of Classification Search
CPC .. H01R 13/6315; H01R 13/64; H01R 13/703; B63J 2003/043; Y02T 10/70
See application file for complete search history.

(56) References Cited

U.S. PATENT DOCUMENTS

| | | | |
|---|---|---|---|
| 6,157,162 A * | 12/2000 | Hayashi | H02J 7/0042 320/104 |
| 2010/0170747 A1 * | 7/2010 | Crook | B66F 11/046 182/2.2 |

(Continued)

FOREIGN PATENT DOCUMENTS

| DE | 235 752 | 5/1986 |
|---|---|---|
| EP | 3 342 626 | 7/2018 |
| JP | 2016-67107 | 4/2016 |

OTHER PUBLICATIONS

International Search Report issued on Jan. 13, 2021 by the European Patent Office in International Application PCT/DE2020/100888.

*Primary Examiner* — Andrew Polay
(74) *Attorney, Agent, or Firm* — K&L Gates LLP (57) ABSTRACT

An energy transmission device for a watercraft includes a tower arranged on land, a telescoping boom connected to the tower for pivoting about a horizontal axis and about a vertical axis, said boom including a free end, and a first plug connected to the free end of the boom and designed to electrically contact for transmission of electrical energy a second upwardly oriented plug on the watercraft via a vertical plugging motion from above by pivoting the boom relative to the tower.

13 Claims, 10 Drawing Sheets

(56) References Cited

U.S. PATENT DOCUMENTS

2012/0031721 A1* 2/2012 Glueckhardt ........... B60L 53/00
                                                    191/12 R
2013/0341144 A1   12/2013 Glückhardt et al.
2018/0326857 A1* 11/2018 Pohjanheimo ............ H02J 7/02

* cited by examiner

Fig. 11 # ENERGY TRANSMISSION DEVICE AND METHOD FOR ENERGY TRANSMISSION

CROSS-REFERENCES TO RELATED APPLICATIONS

This application is the U.S. National Stage of International Application No. PCT/DE2020/100888, filed Oct. 14, 2020, which designated the United States and has been published as International Publication No. WO 2021/073691 A1 and which claims the priority of German Patent Application, Serial No. 10 2019 128 184.9, filed Oct. 18, 2019, pursuant to 35 U.S.C. 119 (a)-(d).

BACKGROUND OF THE INVENTION

The invention relates to an energy transmission device for a watercraft.

Energy transmission devices for watercrafts are required to charge e.g. electrically powered ferries.

The invention is based on the object to further develop the prior art in terms of energy transmission devices for watercrafts.

SUMMARY OF THE INVENTION

This object is achieved with an energy transmission device as set forth hereinafter and by a method for energy transmission as set forth hereinafter.

The energy transmission device according to the invention provides a tower which is arranged on land and carries a boom. The boom is connected to the tower for pivoting about a horizontal axis and about a vertical axis. The boom is capable of telescoping. At its free end, the boom has a first plug that can be coupled to a second plug on the watercraft for transmission of electrical energy.

The plug on the boom is designed to come into electrical contact with the second, upwardly oriented plug on the watercraft for energy transmission in a vertical plugging motion from above by pivoting the boom relative to the tower about said axes.

The energy transmission device according to the invention can be designed for both low-voltage and medium-voltage power transmission.

The term "plug" is representative of a plug component as a male part and/or female part. The plug within the meaning of the invention can refer to a complex assembly, which can include several contacts, positioning aids (electrical, mechanical, electro-mechanical), actuators, heating means, holding and locking means, etc. Since the plug on the boom is moveable and is lowered, the plug on the watercraft can be referred to as socket as plug-in stationary assembly. For ease of understanding, this term "socket" is used hereinafter analogous to the term "plug". The plug/socket on the watercraft is also to be understood as an assembly within the meaning of a plug head. The term "socket" is not limiting in terms of the male/female function.

After the successful docking process and the mooring of the watercraft, in particular a ferry, the landside first plug is positioned by pivoting/rotating/retracting or extending the boom and by moving the first plug above the ship-side socket or the plug there. Positioning is not trivial, since the position of the socket changes relative to the plug. The location depends on the tide, stress and loading conditions of the watercraft, on the swell and on the tolerances in the engagement of a land ramp between land and watercraft.

In order to ensure that the plugging process can be realized in any position of the defined work area and that the plug can be moved by the socket in the plugged position when the watercraft moves in the defined loading zone, the boom and the plug can be moved relative to each other. In particular, the boom can be pivoted about the center axis of the tower and about an axis which is orthogonal to the center axis of the tower. In particular a vertical and a horizontal axis are involved here. The landside tower is designed according to the localities with regard to the work area to be covered. The landside unit therefore includes at least one column or tower with the pivotable boom, at the front end of which the plug is arranged, preferably including heating devices. The landside unit includes at least one control cabinet and a necessary terminal box for energy transmission. When the system is not in use, the landside plug is protected by a cover. The shipside unit is preferably provided with a closure, in particular with a protective roof. Corresponding control cabinets and preferably heaters are also provided on the shipside in order to keep the plug free of ice.

In short, after the watercraft has been moored, the landside plug is positioned vertically above the watercraft-side socket. Thereafter, the roof-side closure of the socket is opened. The landside plug is moved downwards. A fine positioning of the plug relative to the socket for plugging in the power contact follows, After the energy has been transferred, the plug is uncoupled again, the boom is lifted and pivoted into a parking position. The plugs are covered.

The invention is characterized in that the boom covers a very large area, which makes it easier to couple the boom to very different types of watercrafts. All that is required on the water side is a matching plug/a matching socket.

Exact positioning of the plugs is realized with the assistance of sensors. For this purpose, at least one sensor is arranged on at least one of the plugs for positioning the first plug in relation to the second plug, with an evaluation and control unit capable of converting data from the at least one sensor into control signals for activating boom drives, so as to pivot the boom in this way and to couple or also to decouple the plugs. The boom is pivoted or also telescoped about its respective pivot axes via the boom drives.

The detection of the position of the plug relative to the water-side plug or to the socket there is preferably established with the help of a so-called 3D sensor. The 3D sensor recognizes hereby the position of the plug and the socket via reflectors that are arranged on the plugs. Only when the plug has been moved close to the socket is the roof-side closure of the socket opened. This measure serves to protect the system from environmental influences. A control logic ensures that the plug is only lowered further when the closure of the socket is open. The communication between the landside part and the watercraft-side part is implemented in particular wirelessly, preferably via a WLAN connection. In the event of an interruption or loss of the WLAN connection, the plugging process is immediately aborted and the system is switched to an emergency disconnection mode. In this case, the boom is lifted and the plug is pulled out of the socket.

Fine positioning of the plug relative to the socket is preferably realized via ultrasonic sensors. In addition, mechanically triggering contacts can be installed, which recognize a correct position of the power contacts in relation to one another so that they are not damaged when a connection is attempted. The mechanical contacts can be provided in particular because the contacts between the plug and the sockets can be misaligned, despite the fine positioning via ultrasonic sensors. The following are examples of causes for a misalignment:

The plug is connected to the boom for rotation about three axes, so as to have many degrees of freedom. It can be connected to the boom via a ball joint or a ball joint-like connection. When being lowered too quickly, the plug may possibly hit one side of the socket without the fine positioning based on ultrasonic sensors being able to react quickly enough. In this case, the plug rotates and is therefore no longer parallel to the socket. As a result, the ultrasonic sensors may indicate same distances on all sides, even though the plug is not yet in the correct position in relation to the socket.

Another misalignment may result from the fact that the tolerance in the distance measurement permitted by the fine positioning is selected so large that the system indicates a falsely correct position of the plug in relation to the socket.

Finally, it may not be possible in some circumstances to achieve a parallel position of the plug to the socket due to a tilting of the watercraft caused by waves, by land vehicles driving against the ferry or by tolerances in the engagement between the land ramp and the ferry. In this case, the plug would partly hit the socket prematurely and rotate. Also in this case, the ultrasonic sensors could possibly indicate same distances on all sides, even though the plug has not yet assumed the correct position in relation to the socket.

It is therefore considered advantageous when, in addition to the ultrasonic sensors, centering elements and centering receptacles are provided on the plugs or on the socket. The centering receptacles can be funnel-shaped. Also the centering elements can have inclined surfaces such as e.g. conical projections. In this case, the further fine centering is realized via the centering elements and centering receptacles which are mechanically in engagement with one another.

During positioning and during the plugging process, the torques of the boom drives of the boom are set in such a way that neither the drives nor other parts of the system can be damaged, if the position of the watercraft changes in a short time, e.g. because the ship-side socket pushes the landside plug in a certain direction. When plugged in, the boom drive applies a certain torque for the lowering movement in order to ensure a safe plugging process. The corresponding boom arm has to also apply the desired torque in the plugged state in order to maintain the plugged position. At the same time, this boom drive is set to a minimum required torque. The torque can be reduced when the plugs are connected to one another via locking elements that can be activated, e.g. by electric holding magnets. The other boom drives for translational displacement or lateral displacement do not apply any torque in the plugged state, so as not to strain the plug connection.

The individual electrical plug contacts are preferably designed in such a way that during plugging, first the PE contacts—if PE is installed—then the main current contacts and only then are the pilot contacts plugged into one another or rest upon one another. Via the pilot contacts, a signal to release the main current can be given via the main current contacts.

It is considered particularly advantageous when the boom has conductor lines and current collectors that are in contact with the conductor lines, in order to transmit electrical energy to be transmitted from a non-telescoped section of the boom to a telescoped section of the boom.

Furthermore, it is considered to be particularly advantageous when the boom is coupled to a boom lifter. The boom lifter is not the same as a boom drive which raises or lowers the boom lifter. The boom lifter should function even when the entire system fails and should also be able in this case to disconnect the plug connection. For this purpose, the boom lifter applies a boom lifting force to the boom. The boom lifting force can be retrieved from an energy store. It may involve e.g. a spring force accumulator, gas pressure accumulator or also a magnetic force or a weight force (potential energy).

This force is so great that the plug can be separated from the socket by the boom lifting force alone. The boom lifter is based in particular on a weight force. In particular, a counterweight is involved which is arranged on the end of the boom facing away from the first plug, comparable to a counterweight in a rotating tower crane. As an alternative, the counterweight may also be arranged at another area, e.g. in/on the tower and exert the desired boom lifting force on the boom, for example via a tackle. The boom lifting force acts always upwards for the plug. The boom drive, which is provided to lower the plug, opposes this boom lifting force. For decoupling, the torque of the corresponding drive only has to be reduced to such an extent that the boom lifting force exerts a greater moment on the plug than the corresponding drive. Even when the drive fails, the plug is automatically pulled out of the plugged position by the boom lifting force.

In the event that the watercraft moves outside of the defined work area that the landside boom can compensate for, or in the event of a loss of a communication signal between landside and watercraft-side, the power transmission system is switched to the emergency disconnect mode. The driving torque of the drive for the vertical lowering of the boom is hereby reduced to a minimum, so that the boom lifter can lift the plug from the socket within a short time. The outer boundaries of the permissible work area of the boom are detected with the aid of sensors. When one of these sensors is triggered, the system is switched to the emergency disconnect mode. Even after conclusion of the charging process of a ferry or after release of the watercraft, the torque of the boom drive, which is responsible for lowering the boom, is switched to a lower value, so that the plug is lifted from the socket by the boom lifting force, which results in particular from weight force. The boom is pivoted into a parking position with the help of a boom drive. Only then may the watercraft be unfastened and depart. When docking, the process is reversed.

It is considered to be particularly advantageous when the landside plug is comprised of two assemblies that are movable relative to one another. A releasable locking mechanism can become operative between these assemblies in order to hold the two assemblies in a starting position. In the starting position, the assemblies are spaced apart (top/bottom). The releasable locking mechanism applies a locking force, e.g. by electromagnets and/or a minimum force to be overcome, e.g. by compression springs. The principle is explained below with reference to compression springs.

The compression springs act in the plug-in direction, i.e. vertically up/down. A lower assembly of the first plug is connected to the upper assembly and is displaceable relative to the upper assembly. When the plug is already in close proximity to the socket or positioning via ultrasonic sensors is not entirely possible in a precise manner, mechanical positioning can be carried out using the centering elements and centering receptacles. The releasable locking mechanism or the compression springs are preferably designed to be so strong that they initially do not yield during mechanical positioning. This means that the plug is initially pushed into the socket only until the centering elements engage within one another and lie on top of each other. In this state, it is ensured that the two plugs are precisely positioned. Only when the centering elements and centering receptacles, preferably conical surfaces, rest on one another and the drive of the boom presses the plug further down do the compression springs or the releasable locking mechanism yield. At this point in time, it is, however, already ensured that the electrical contacts are also positioned exactly above one another. When the locking mechanism yields, the upper assembly of the plug moves further down in relation to the lower assembly and the electrical contacts are coupled. I.e. as the plug is pressed in, a first assembly of the plug is already positioned and the position thereof is not altered any further, while the upper assembly, which is supported in relation to the first assembly, continues to be lowered in opposition to the locking mechanism, e.g. in opposition to a spring force or a magnetic force, and is also held in this position by the drive of the boom during the entire plugging process.

As a result of the rough positioning, the subsequent fine positioning and in combination with the mechanical centering elements, the energy transmission device according to the invention may be plugged-in in a precise manner, even when the watercraft is not exactly parallel to the first plug. The plug can be rotated into the correct position via additional drives, in particular it can be pivoted about a vertical axis of the plug.

BRIEF DESCRIPTION OF THE DRAWING

The invention is explained hereinafter with reference to schematically shown exemplary embodiments. It is shown in:

FIG. 9a an enlarged view of the plug 5 of FIG. 6a;

DETAILED DESCRIPTION OF PREFERRED EMBODIMENTS

Figure 1:
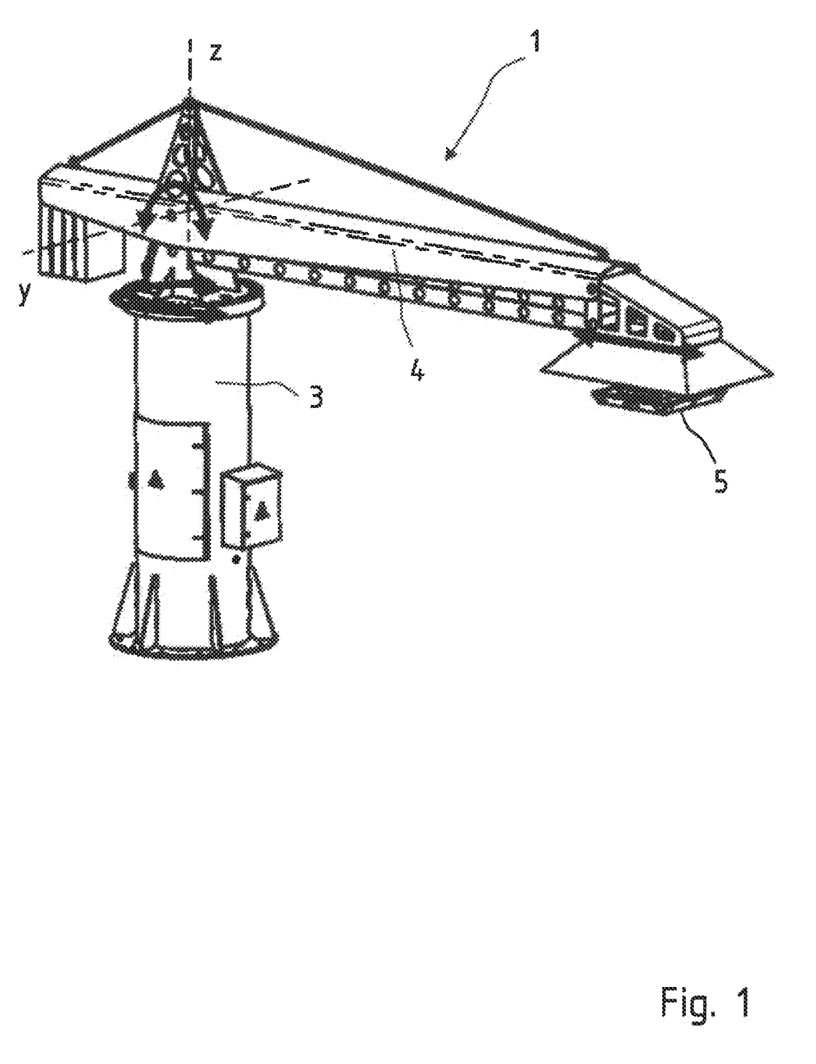
FIG. 1 a perspective view of an energy transmission device.
Figure 4:
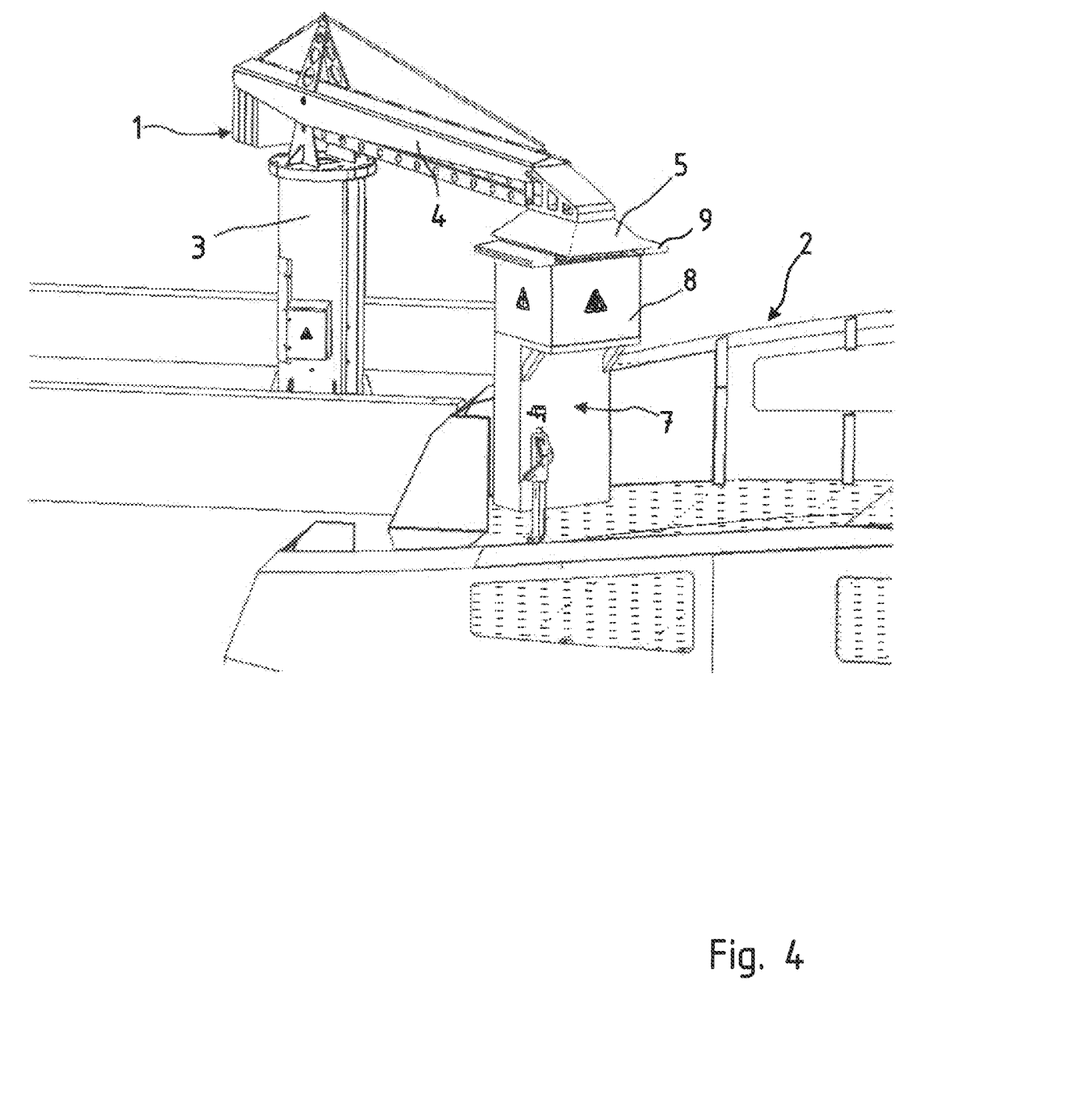
FIG. 4 the energy transmission device of FIG. 1 in the plugged state.
Figure 5:
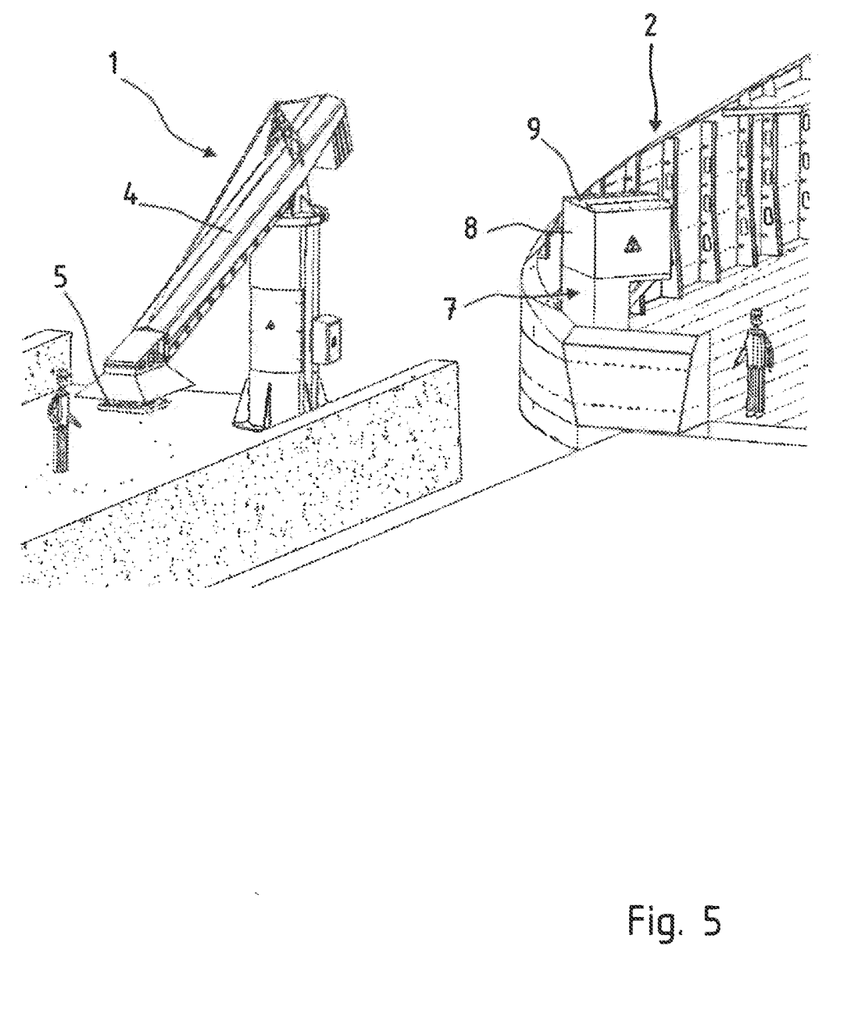
FIG. 5 the energy transmission device from FIG. 1 in a parking position.
Figure 6:
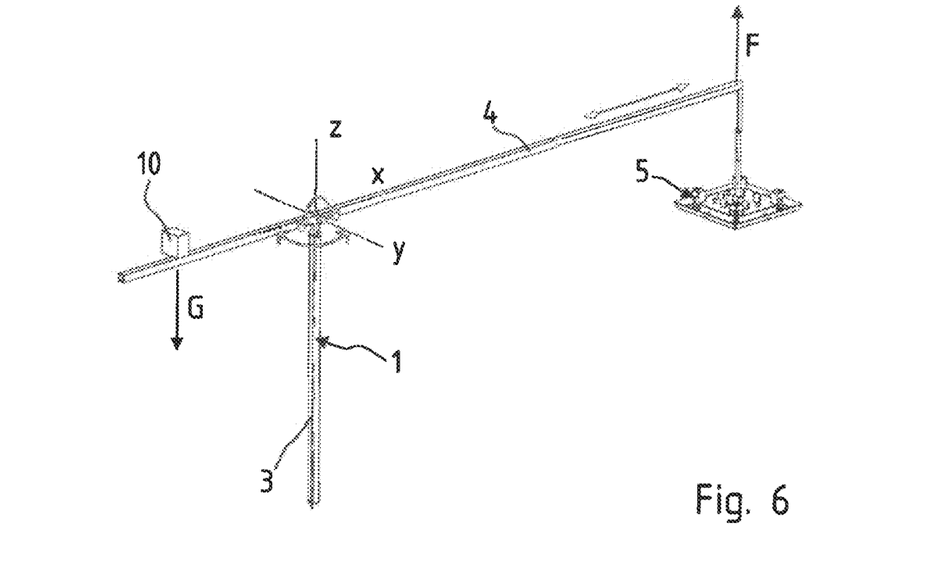
FIG. 6 a purely schematic representation of a further exemplary embodiment of an energy transmission device.

FIG. 1 shows an energy transmission device 1 for a watercraft 2, as shown in FIGS. 2 to 5. The watercraft 2 is a ferry that is operated electrically. The energy transmission device 1 includes a tower 3 and a boom 4 which is arranged at the top of the tower 1 and has two legs. The tower 3 is arranged in a central region of the boom 4 and divides it into a longer and a shorter region. The boom 4 is pivotable relative to the tower 3. The arrows drawn in FIG. 1 indicate that the boom 4 can be pivoted both about a horizontal axis, which is designated by Y, and about a vertical axis, which is designated by Z. FIG. 6 shows a simplified illustration of the kinematic principle. In addition, the boom 4 can be telescoped in its longitudinal direction. The positions of the boom 4, shown in FIGS. 1 and 6, point respectively in the X-direction of the Cartesian coordinate system. The boom 4 can also be telescoped even when it was previously pivoted about the horizontal axis Y or the vertical axis Z, i.e. it does not point in the X direction.

Figure 2:
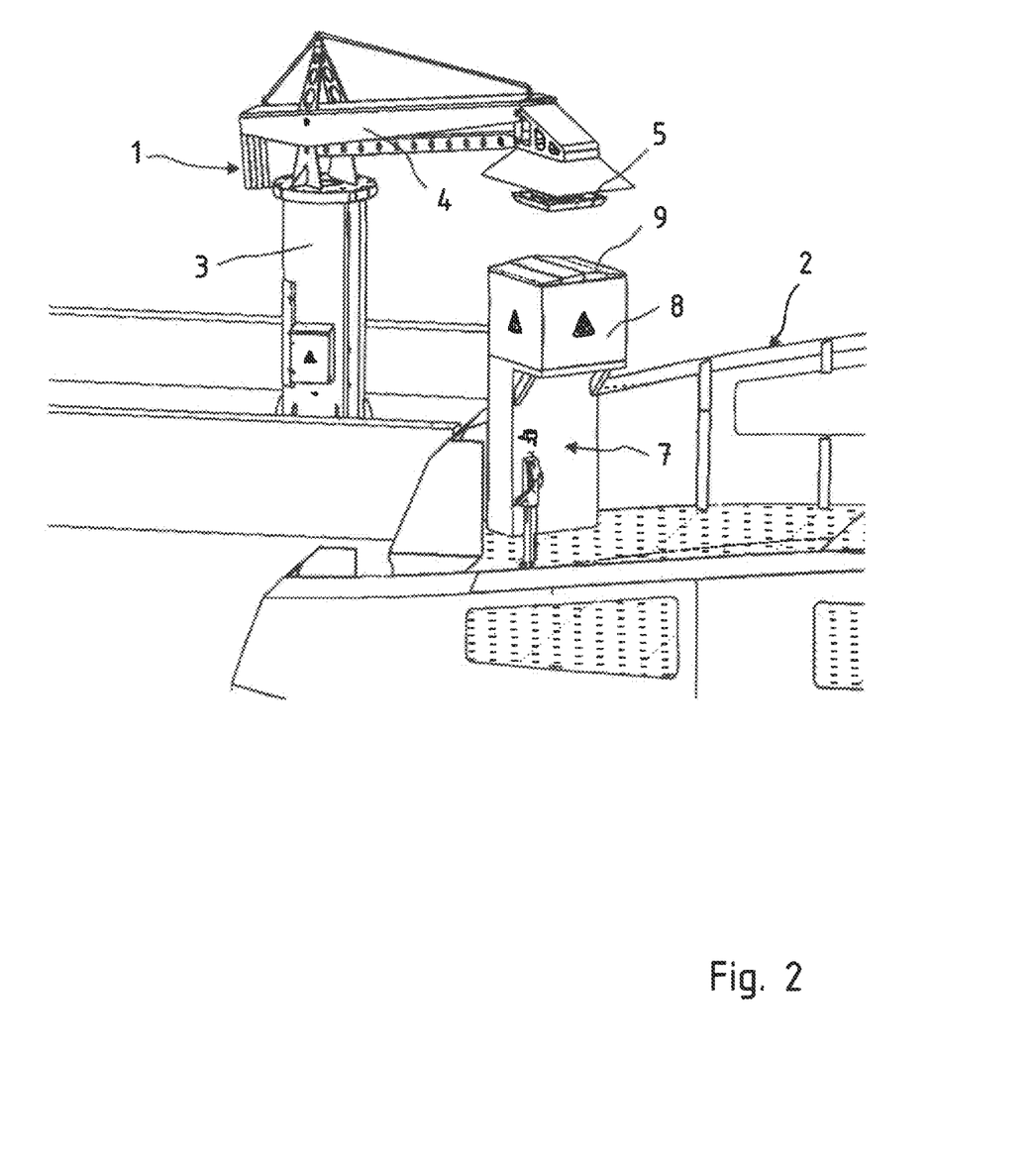
FIG. 2 the energy transmission device of FIG. 1 during a positioning process.
Figure 3:
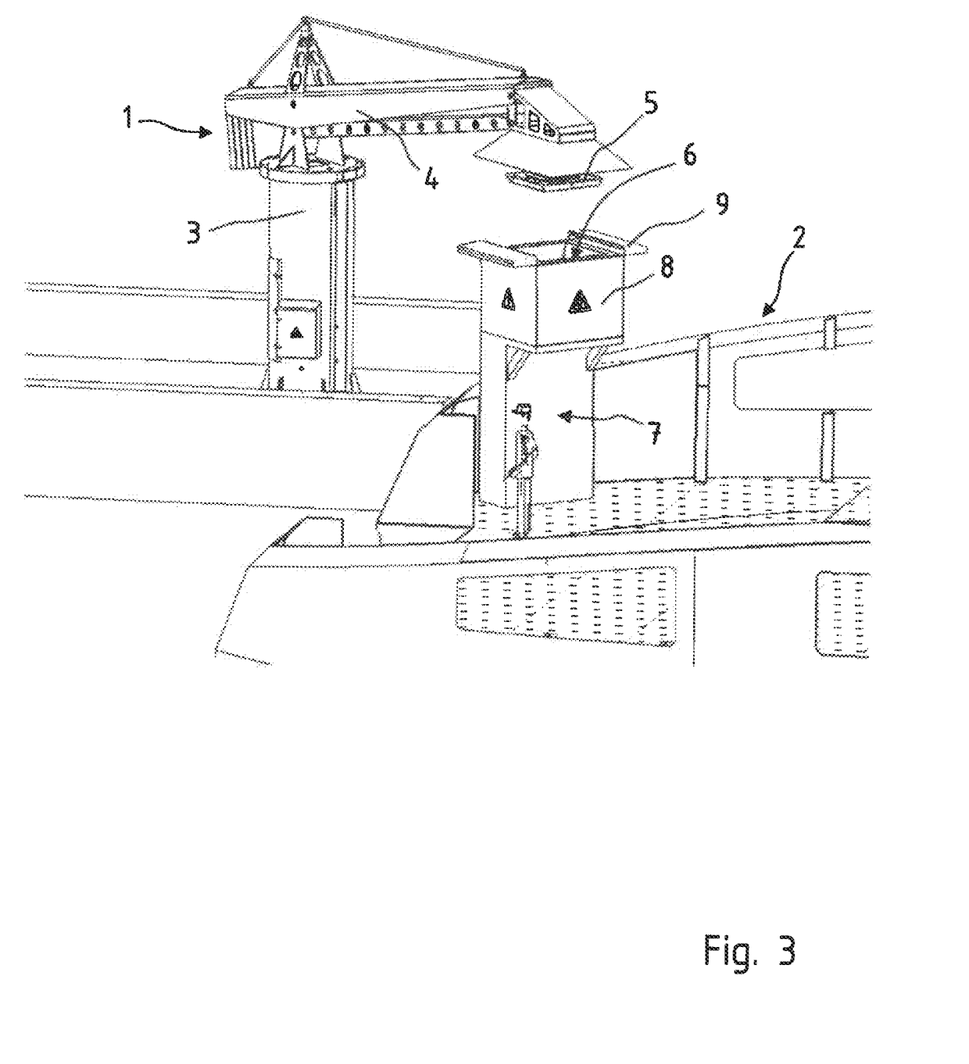
FIG. 3 the positioning device of FIG. 1 before being lowered onto a socket on a watercraft.

The boom 4 has a plug 5 at its free end. The plug 5 is representative of a larger assembly (plug head, coupling unit), the main task of which is to establish an electrically conductive contact for power transmission from the land side to the watercraft 2. For this purpose, the plug 5 has to be brought into the correct position relative to the counterpart on the watercraft 2. FIG. 2 shows that the boom 4 is initially pivoted to such an extent that the plug 5 is located on the watercraft 2 above a plug 6 serving as a socket (FIG. 3, concealed). The socket is located in a tower-like structure 7 on the watercraft 2. The tower-like structure 7 has an upper end which carries the socket. The socket itself is situated within a housing 8 at the upper end of the structure 7 to protect the socket from weather conditions when not in use. The housing 8 has a roof-like closure 9 on the topside. The closure 9 is closed in FIG. 2. In FIG. 3, the closure 9 is open. A flat roof construction may be involved, which is made of one or more segments that open when being shifted relative to each other in the horizontal direction to thereby expose the inside socket (sliding roof).

To establish a plug connection, the plug 5 has to be lowered onto the socket 6. This is shown in FIG. 4. The plug contact is maintained as long as energy and/or data are to be transmitted. The boom 4 is then raised again and pivoted into a parking position, as shown in FIG. 5. The closure 9 on the housing 8 above the socket 6 is closed again. The watercraft 2 can depart.

The method according to the invention will be explained in detail hereinafter with reference to FIGS. 6 to 11. The reference signs introduced above continue to be used for essentially the same components.

Figure 7:
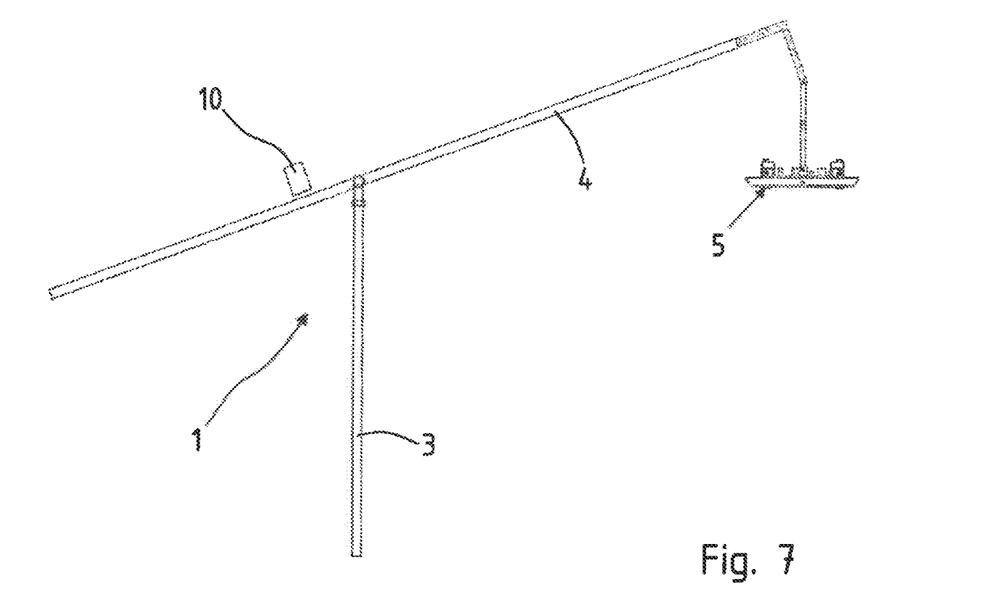
FIG. 7 the energy transmission device of FIG. 6 with the plug being lifted.

FIG. 6 shows the kinematic principle of the energy transmission device 1 according to the invention. The boom 4 is pivotable on the tower 3 about the shown horizontal axis Y and about the vertical axis Z. A translational movement is possible in X direction. The plug 5 is arranged at one end of the boom 4. Arranged at the other end of the boom 4 is a counterweight to serve as boom lifter 10. The boom lifter 10 uses its weight G to exert an upward boom lifting force F on the boom 4 or the plug 5. As the horizontal axis Y is located between the boom lifter 10 and the plug 5, the movements of the ends of the boom 4 in the vertical direction are opposite. When the boom 4 is raised, as shown in FIG. 7, a rigid connection between the plug 5 and the boom 4 would result in an angle change at the plug 5. In order to avoid this, a drive can be provided on the plug 5, by means of which the plug 5 is tilted. As a result, the plug 5 is situated at all times parallel to the ground. The plug 5 is mounted in a ball joint.

Figure 6A:
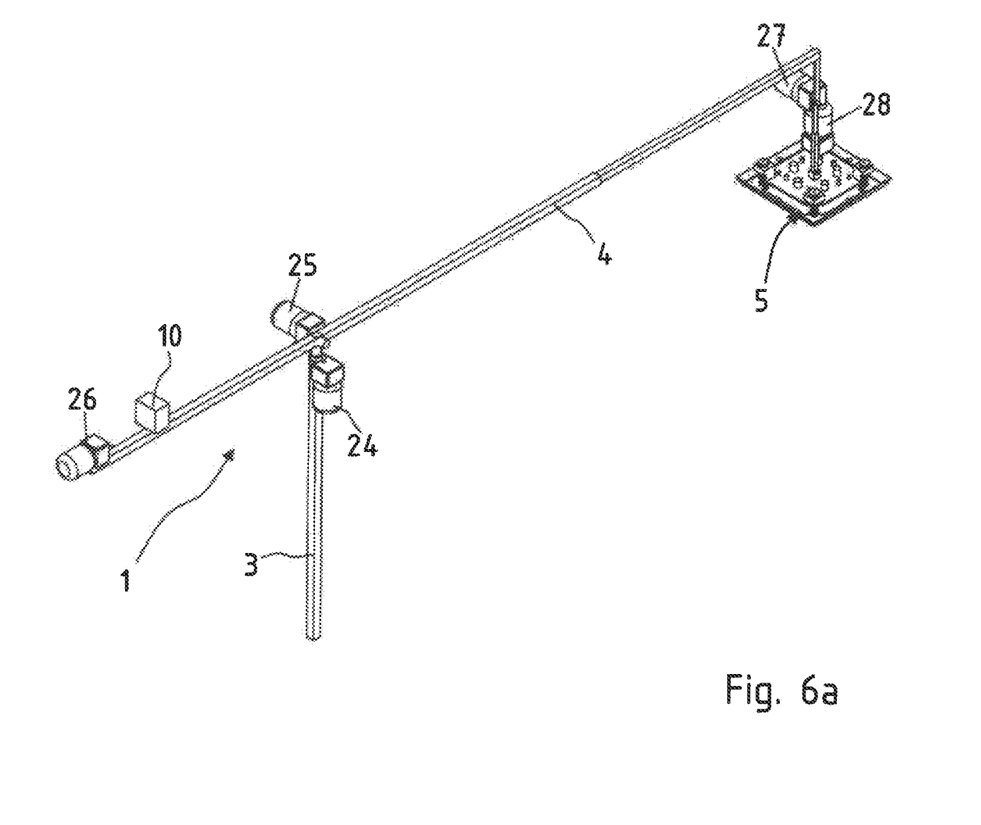
FIG. 6a a purely schematic representation of a further exemplary embodiment of an energy transmission device.

FIG. 6a shows an exemplary embodiment with various drives. The energy transmission system includes a drive 24 for the vertical rotation axis and a drive 25 for a horizontal rotation axis. In addition, a drive 26 is arranged at the rear end of the boom 4, which is responsible for telescoping and the counterweight.

Another drive 27 at the opposite end causes the plug 5 to incline in the desired direction. Finally, provision is made for another drive 28 to turn the plug 5 in the desired direction. The drives are shown purely schematically and are shown again in FIG. 9a on an enlarged scale.

Figure 8:
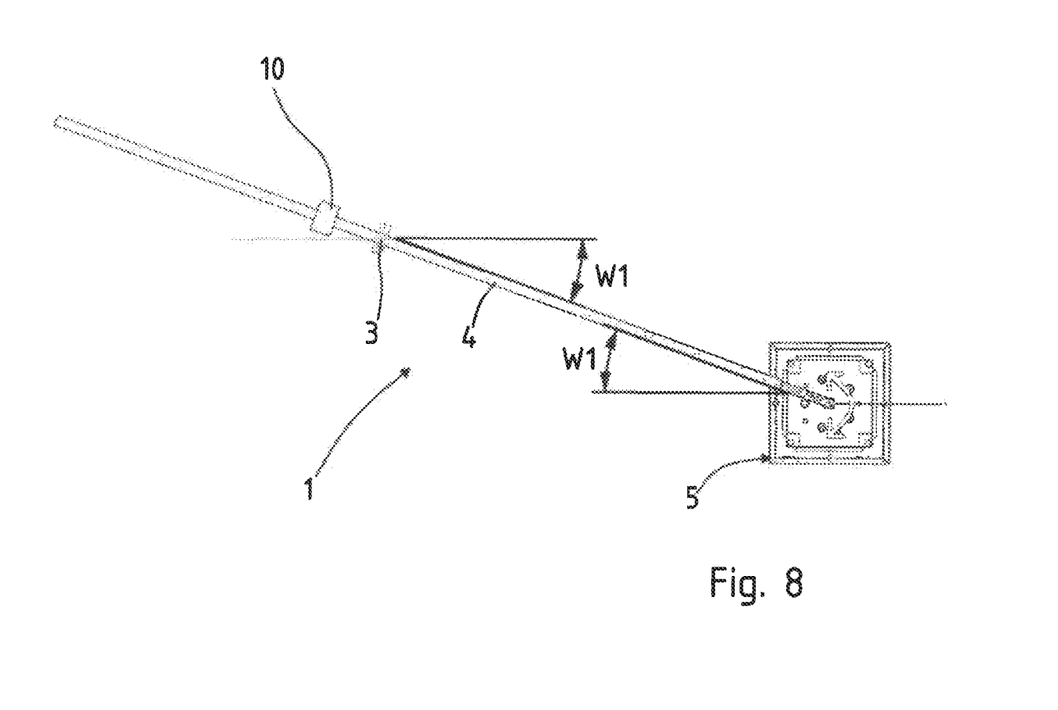
FIG. 8 the energy transmission device of FIGS. 6 and 7 with the plug deflected to the side.

FIG. 8 shows the interaction of the drives. When, for example, the plug 5 should be pivoted or also shifted only in parallel relation to the starting position, the pivot angle W1 has to be adjusted on the tower 3 through horizontal pivoting of the boom 4. At the same time, the pivot angle W1 has to be pivoted relative to the boom 4 through pivoting the plug 5 in the opposite direction. Depending on how far the boom 4 is telescoped, the position of the boom lifter 10 in the form of the counterweight may also have to be adjusted.

The rough positioning of the landside plug 5 in relation to the watercraft-side socket is carried out using a 3D sensor system. The functional principle of the sensors is based in particular on a time-of-flight process. The sensors can be provided both on the landside plug 5 and on the water-side socket. The first positioning is realized using a photonic mixing detector (PMD). The relative spatial position of the landside reflectors to the ship-side reflectors is ascertained with the photonic mixing detector. The landside plug 5 is then moved in such a way that the preset target value of the position of the landside reflectors in relation to the ship-side reflectors is reached.

Figure 9:
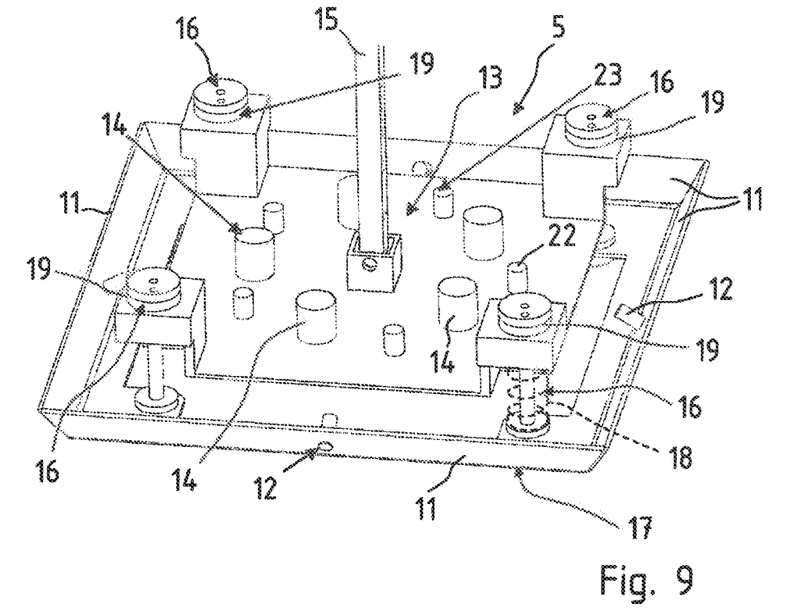
FIG. 9 a perspective view from above of the plug of FIG. 8.
Figure 9A:
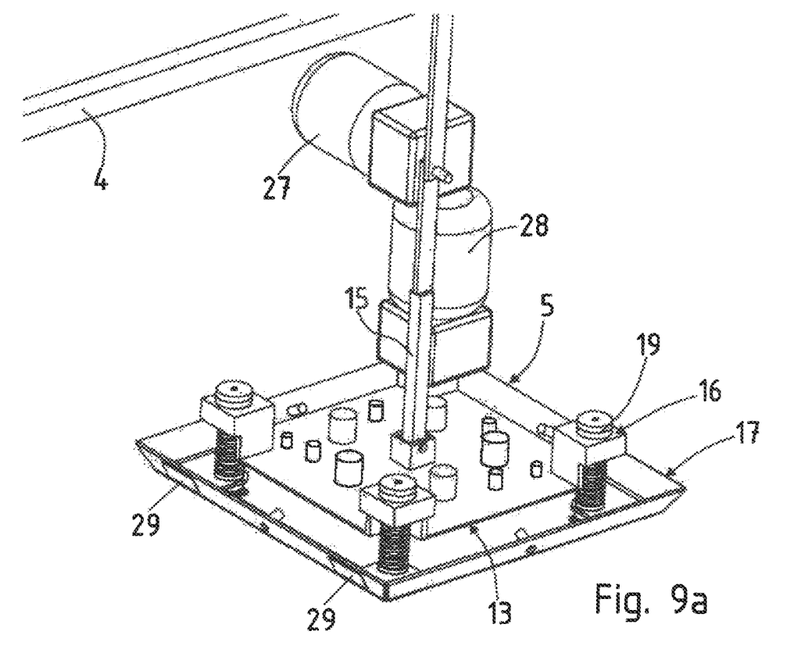

This is followed by a fine positioning with the aid of ultrasonic sensors. Outer metal sheets or positioning surfaces of the plug 5 or socket 6 are preferably funnel-shaped for this purpose. FIGS. 9 and 9a show that the positioning surfaces 11, which are arranged in a rectangle or square, are each set at an angle, so that a downwardly tapering truncated pyramid is formed. A sensor 12 in the form of an ultrasonic sensor is located on each of the four longitudinal positioning surfaces 11. The sensors 12 determine per ultrasound the distance to the corresponding positioning surfaces on the socket. The plug is aligned until all four ultrasonic sensors 12 indicate an approximately equal distance to the corresponding positioning surface 11 on the socket. The magnitude of this target distance is defined in advance.

The two successive steps of rough positioning and fine positioning generally enable a sufficiently precise position of the plug 5 relative to the socket 6.

Figure 10:
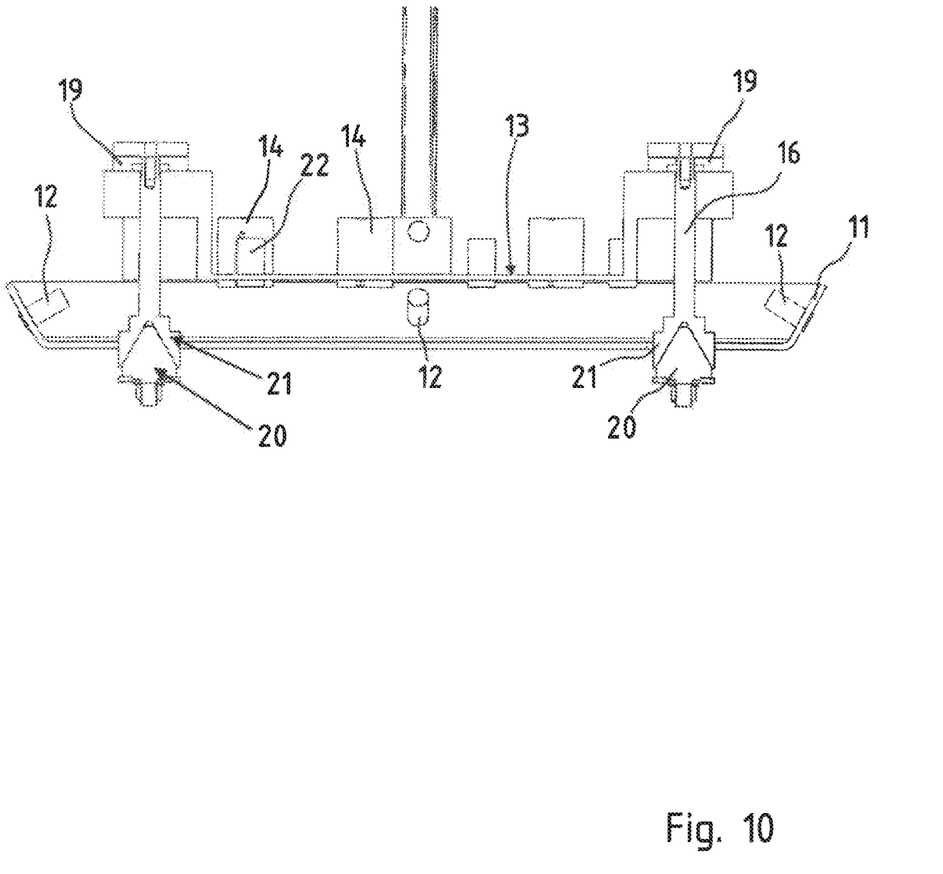
FIG. 10 a side view of the plug of FIG. 9 in the coupled state.

FIGS. 9 and 10 further show that the plug 5 is comprised of two assemblies that are movable relative to one another. The plug 5 includes on one hand a support plate 13. Several power contacts 14 are arranged on the support plate 13. The support plate 13 is mounted suspended on the boom 4 via a strut 15. The strut 15 is pivotally displaceable relative to the boom 4 in three spatial directions. The plug 5 can be raised and lowered by the boom 4 via the strut 15 and also rotated into the correct position.

The support plate 13 has connecting elements 16 in each corner area. The support plate 13 is movably connected via the connecting elements 16 to a positioning frame 17 as lower assembly. The positioning frame 17 includes the positioning surfaces 11 which are arranged in a funnel shape. The positioning frame 17 is optionally supported against the support plate via compression springs 18 which surround the connecting elements 16. Provision may be made for holding electromagnets 19 as an alternative or in addition to the compression springs 18 in order to initially hold the connecting elements 16 in the moved-out position.

In this exemplary embodiment, centering elements 20 in the form of several centering cones are situated in addition on the ship-side. These centering cones engage in the correct position in centering receptacles 21. The centering receptacles 21 are located below the connecting elements 16. The connecting elements 16 are firmly connected to the positioning frame and are mounted on the support plate 13 for longitudinal displacement. The connecting elements 16 guide the support plate 13 against lateral displacements and prevent the support plate 13 from twisting relative to the positioning frame 17. Thus, when the connecting elements 16 are centered exactly on the centering receptacles 21, not only is the positioning frame 17 in the correct position, but also the support plate 13 with the electrical contacts. FIG. 10 shows the centering receptacle 20 as having a funnel shape, whereas the centering element 21 has a matching cone shape.

When the plug 5 is twisted in relation to the socket in space or when the positioning by the ultrasonic sensors is not quite accurate enough, a mechanical positioning is realized via the centering elements 20 and the centering receptacles 21. At this point in time, anchoring of the connecting elements, i.e. either compression springs, which act between the support plate 13 and the positioning frame 17, or holding electromagnets, hold the support plate 13 still at a vertical distance to the positioning frame 17. The plug 5 is now lowered further by overcoming the spring force or the retention force via the boom 4. As a result, the power contacts 14 of the plug 5 come into contact with the associated plug contacts on the socket.

When plugging in, contact is first established between a grounding contact mounted on the support plate 13 and the opposite side (watercraft), Then, the main current contacts interlock. Only then do the pilot contacts attached to the support plate 13 and the opposite side (watercraft) make contact. A signal that is sent via the pilot contacts releases the current to activate the holding electromagnets 23 mounted on the support plate 13, Instead of holding electromagnets, other anchoring means can be provided to hold the plug 5 in the socket during energy transmission. These anchors, for example via holding electromagnets, hold the landside plug with the ship-side socket together, so that the boom drive of the boom 4 does not have to continuously apply so much torque to ensure a secure contact.

Figure 11:
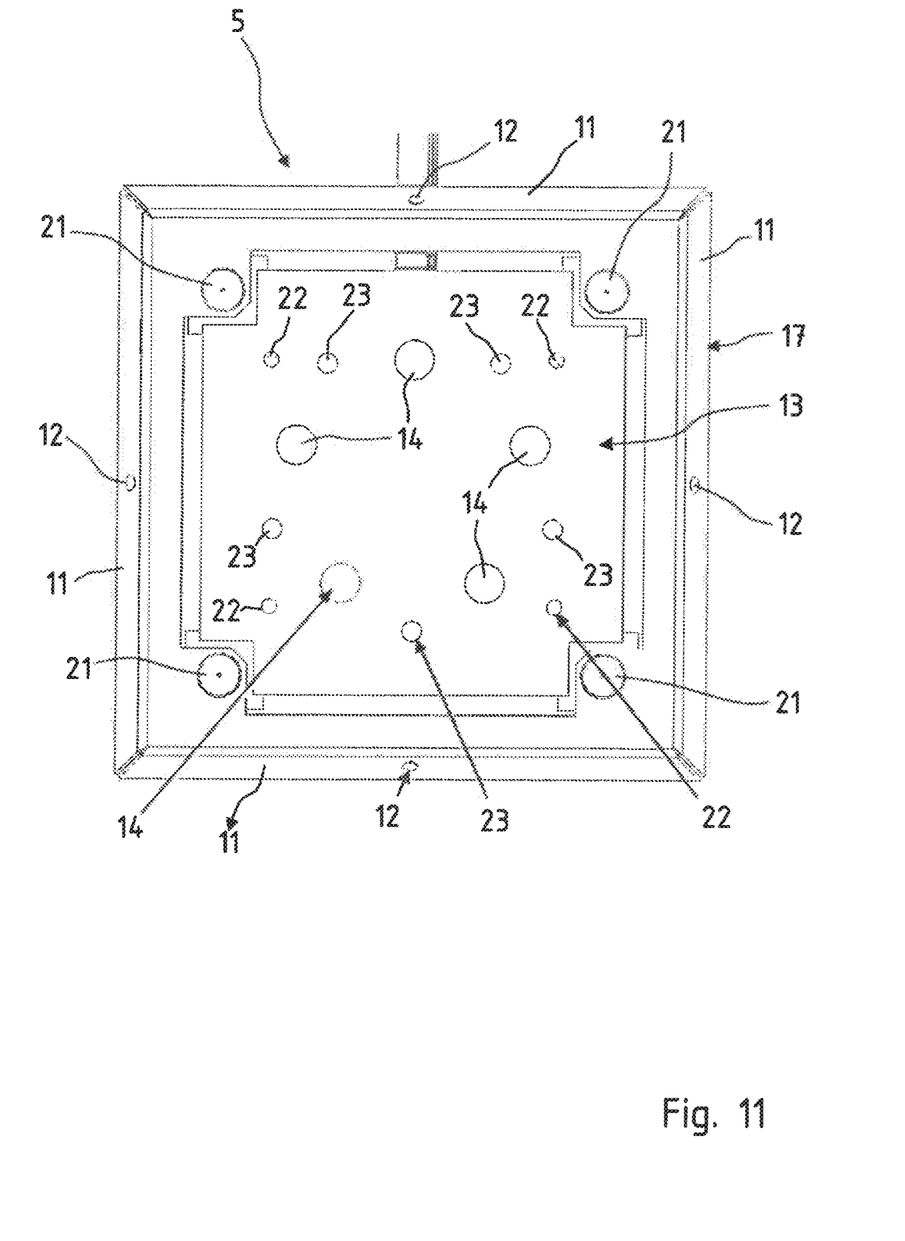
FIG. 11 a bottom view of the plug of FIG. 10.

FIG. 11 shows a view from below of the outer positioning frame 17 with its funnel-shaped positioning surfaces 11 and the support plate 13 with five evenly distributed power contacts 14 as well as several pilot contacts 22, which are arranged in a square. In addition, there are holding electromagnets 23 in alternating relation with the power contacts 14 on the underside of the support plate 13.

The positioning frame 17 furthermore shows the sensors 12 for ultrasonic positioning and the conical centering receptacles 21, which are each arranged in the corner region of the positioning frame 17. FIG. 9a also shows reflector plates 29 arranged in the corner region.

What is claimed is:

1. An energy transmission device for a watercraft, said energy transmission device comprising:

a tower arranged on land;

a telescoping boom connected to the tower for pivoting about a horizontal axis and about a vertical axis, said boom including a free end;

a first plug connected to the free end of the boom and designed to electrically contact for transmission of electrical energy a second upwardly oriented plug on the watercraft via a vertical plugging motion from above by pivoting the boom relative to the tower;
a drive operably connected to the boom;
a sensor arranged on at least one of the first and second plugs for positioning the first plug relative to the second plug;
an evaluation and control unit designed to convert data from the sensor into a control signal for activating the drive so as to pivot the boom in order to couple or uncouple the first and second plugs; and
reflectors arranged on the first and second plugs for reflecting a sensor signal from the sensor.

2. The energy transmission device of claim 1, wherein the first plug is connected to the boom for rotation about three axes.

3. The energy transmission device of claim 1, further comprising centering elements having inclined surfaces for engagement in centering receptacles on the other one of the first and second plugs, when the first and second plugs are coupled.

4. The energy transmission device of claim 3, further comprising compression springs arranged on at least one of the first and second plugs and configured to apply a spring force which after mechanical centering via the centering elements and centering receptacles opposes a further approach of the first and second plugs, so that an electrical contact between the first and second plugs only exists when the spring force is less than a force generated as the boom is actively lowered.

5. The energy transmission device of claim 1, wherein the boom includes conductor lines and current collectors in contact with the conductor lines so as to transmit electrical energy from a non-telescoped section of the boom to a telescoped section of the boom.

6. The energy transmission device of claim 1, further comprising a boom lifter coupled to the boom and designed to exert on the boom a boom lifting force which is solely sufficient to separate the first plug from the second plug.

7. The energy transmission device of claim 6, wherein the boom lifter includes a counterweight which is arranged on an end of the boom which end faces away from the first plug.

8. A method for the transmission of electrical energy to a watercraft via an energy transmission device which comprises a boom with a first plug, said method comprising:
maneuvering the watercraft to bring a second plug within range of the first plug;
telescoping and pivoting the boom horizontally and vertically into a position in which the first plug is located above the second plug;
measuring with a sensor a distance between the first and second plugs to generate data;
lowering the boom as a function of control data calculated from the measured data in opposition to a spring force acting between the first and second plugs such that mechanical centering elements and centering receptacles become engaged between the first and second plugs and an electrical contact between the first and second plugs for energy transmission is established; and
releasing a plug connection between the first and second plugs by reducing a force which lowers the first plug until the first plug is lifted by a boom lifting force of a boom lifter.

9. An energy transmission device for a watercraft, said energy transmission device comprising:
a tower arranged on land;
a telescoping boom connected to the tower for pivoting about a horizontal axis and about a vertical axis, said boom including a free end;
a first plug connected to the free end of the boom and designed to electrically contact for transmission of electrical energy a second upwardly oriented plug on the watercraft via a vertical plugging motion from above by pivoting the boom relative to the tower;
a drive operably connected to the boom;
a sensor arranged on at least one of the first and second plugs for positioning the first plug relative to the second plug;
an evaluation and control unit designed to convert data from the sensor into a control signal for activating the drive so as to pivot the boom in order to couple or uncouple the first and second plugs;
centering elements having inclined surfaces for engagement in centering receptacles on the other one of the first and second plugs, when the first and second plugs are coupled; and
compression springs arranged on at least one of the first and second plugs and configured to apply a spring force which after mechanical centering via the centering elements and centering receptacles opposes a further approach of the first and second plugs, so that an electrical contact between the first and second plugs only exists when the spring force is less than a force generated as the boom is actively lowered.

10. The energy transmission device of claim 9, wherein the first plug is connected to the boom for rotation about three axes.

11. The energy transmission device of claim 9, wherein the boom includes conductor lines and current collectors in contact with the conductor lines so as to transmit electrical energy from a non-telescoped section of the boom to a telescoped section of the boom.

12. The energy transmission device of claim 9, further comprising a boom lifter coupled to the boom and designed to exert on the boom a boom lifting force which is solely sufficient to separate the first plug from the second plug.

13. The energy transmission device of claim 12, wherein the boom lifter includes a counterweight which is arranged on an end of the boom which end faces away from the first plug.

* * * * *